United States Patent
Pringiers (10) Patent No.: US 7,823,989 B2
(45) Date of Patent: Nov. 2, 2010

(54) RUBBER CRAWLER HAVING FIRST AND SECOND RUBBER COMPOSITIONS

(75) Inventor: Koenraad Pringiers, Colombo (LK)

(73) Assignee: Solideal Holding SA, Luxembourg (LU)

( * ) Notice: Subject to any disclaimer, the term of this patent is extended or adjusted under 35 U.S.C. 154(b) by 16 days.

(21) Appl. No.: 11/935,751

(22) Filed: Nov. 6, 2007

(65) Prior Publication Data

US 2008/0129111 A1 Jun. 5, 2008

(30) Foreign Application Priority Data

Nov. 23, 2006 (EP) .................................. 06124688

(51) Int. Cl.
*B62D 55/24* (2006.01)
(52) U.S. Cl. ........................ 305/172; 305/176; 305/177
(58) Field of Classification Search .................. 305/41, 305/42, 43, 165, 166, 167, 171–177
See application file for complete search history.

(56) References Cited

U.S. PATENT DOCUMENTS

| | | | | |
|---|---|---|---|---|
| 2,462,643 | A * | 2/1949 | Johnson et al. | 305/101 |
| 4,323,102 | A * | 4/1982 | Hall | 152/175 |
| 4,645,274 | A * | 2/1987 | Wohlford et al. | 305/47 |
| 5,131,728 | A * | 7/1992 | Katoh et al. | 305/174 |
| 5,482,364 | A * | 1/1996 | Edwards et al. | 305/157 |
| 7,131,709 | B2 * | 11/2006 | Ueno | 305/177 |
| 2005/0168069 | A1 * | 8/2005 | Ueno | 305/171 |
| 2006/0279138 | A1 * | 12/2006 | Kato et al. | 305/177 |

FOREIGN PATENT DOCUMENTS

| | | | |
|---|---|---|---|
| EP | 0 490 829 A1 | | 6/1992 |
| EP | 495122 A1 | * | 7/1992 |
| JP | 56090776 A | * | 7/1981 |
| JP | 04201786 A | * | 7/1992 |
| JP | 05221345 A | * | 8/1993 |

* cited by examiner

*Primary Examiner*—Russell D Stormer
(74) *Attorney, Agent, or Firm*—Jacobson Holman PLLC (57) ABSTRACT

A rubber crawler (1) has a plurality of parallel metal links (11) embedded at regular distances from each other in circumferential direction of a rubber belt (22) and extending in the lateral direction of the rubber belt (22), each metal link (11) including a first (3) and second (13) protrusion at opposing sides (6, 16) of a sprocket (15) provided with an upper surface (7, 17) for guiding supporting rollers, extending in a height direction of the metal link (11) with respect to a base (5), each protrusion (3, 13) including a first (4) and a second (14) running surface element which extends in the longitudinal direction of the crawler (1), in which the second running surface element (14) is positioned shifted in longitudinal and the lateral direction of the belt (22) with respect to the first running surface element (4), in which the first (4) and the second (14) running surface of adjacent metal links (11) are positioned at least partially adjacent with respect to each other in the longitudinal direction, wherein the base (5) of the metal links (11) is at least partially embedded into a first rubber composition (20) and wherein the first (3) and second (13) protrusions of adjacent metal links (11) are at least partially embedded in and connected to each other by a second rubber composition (21) which has a higher elasticity than the first rubber composition (20) and which is connected with the first rubber composition (20) forming a continuous layer of rubber.

18 Claims, 9 Drawing Sheets

RUBBER CRAWLER HAVING FIRST AND SECOND RUBBER COMPOSITIONS

FIELD OF THE INVENTION

The present invention relates to a rubber crawler supporting an endless rubber belt guided around two toothed wheels and supporting rollers positioned between them, a plurality of parallel metal links being embedded at regular distances from each other in circumferential direction of the rubber belt and extending in the lateral direction of the rubber belt.

BACKGROUND

Such a rubber crawler which is guided around two toothed wheels is already known from EP-A1-0490829 in which a rubber belt is disclosed comprising different metal links on regular distances with respect to each other for driving a vehicle, which support the weight of the vehicle and which are provided extending parallel to each other in transversal direction of the rubber belt. The metal links guide supporting rollers which are provided between the two toothed wheels. The metal links comprise a base in which the center is provided with a sprocket to which the toothed wheels can grasp. A wing is provided on opposing sides of the sprocket in a lateral direction extending in the lateral direction of the rubber belt. The wings are embedded in the rubber of the of the rubber belt. First and second protrusions extend in a height direction with respect to the base and are not embedded in the rubber. Each protrusion comprises a first and a second running surface element which extends in a longitudinal direction of the rubber crawler such that the first running surface elements are located on one side of the metal link and the second running surface elements are located on an opposing side of the metal link and in which the second running surface element is mounted shifted in longitudinal and the lateral direction of the rubber belt with respect to the first running surface element. The first protrusion comprises a first upper surface and the second protrusion comprises a second upper surface, in which the upper surfaces form a running surface for guiding the supporting rollers. The first and the second running surface elements of the respective first and second protrusions of adjacent metal links at least partially lie next to each other such that the running surface elements of adjacent metal links overlap at least partially in the longitudinal direction of the rubber crawler creating a common surface in the longitudinal direction of the rubber crawler in which the respective first and second running surface elements of the different metal links extend in line. The shift in the lateral direction of the first running surface elements with respect to the second running surface elements is for each protrusion such that the first running surface elements of a metal link are held between the second running surface element of an adjacent metal link, mutually anchoring the metal links. The protrusions in a side view have a trapezoidal shape with a narrow underside at the sprocket and a broad upperside for supporting the supporting rollers.

The rubber band described in EP-A1-0490829 however has the disadvantage that the overlap in the longitudinal direction of the crawler of the adjacent metal links is insufficient to guarantee a continuous mutual anchoring. When the rubber belt is driven over a local elevation, such as a stone or a step, the adjacent first and second running surface elements are moved away from each other, reducing the overlap. This has as a consequence that the overlap becomes too small for the second running surfaces to hold the first running surfaces causing the possibility for the first running surfaces to break out their mutual anchored configuration. The rubber belt in other words detracks causing the rubber belt to deform and making it unusable. The metal links can hereby become seriously damaged.

SUMMARY OF THE INVENTION

It is therefore the object of the invention to provide a new rubber belt with a decreased risk to detracking.

Thereto, in the rubber belt according to the invention the base of the metal links is at least partially embedded into a first rubber composition and the first and second protrusions of adjacent metal links are at least partially embedded in and connected to each other by a second rubber composition which has a higher elasticity than the first rubber composition and which is connected with the first rubber composition forming a continuous layer of rubber.

DETAILED DESCRIPTION OF THE INVENTION

An important advantage of this invention is that the rubber crawler detracks less easily because the respective first and second protrusions of adjacent metal links are linked to each other by a second more elastic rubber composition comprising an increased elasticity and which holds the respective first and second protrusions of adjacent metal links at their correct position because of which the first running surfaces can less easily break out their predetermined configuration. The second rubber composition also ensures that when the overlapping first and second running surfaces of the respective first and second protrusions of adjacent metal links move away from each other upon bending the rubber belt, the second rubber composition redirects the protrusions to their original location when the rubber belt returns to its flat form. As a consequence the first running surfaces maintain their predetermined configuration and the risk for detracking is reduced to a minimum.

Because the second rubber composition is elastic, the connections between the different overlapping running surfaces become pliable, thus making the entire rubber belt more elastic than a rubber belt which only comprises the less elastic first composition. This reduces the risk to wearing and ensures an improved operational reliability of the rubber belt. Since the risk to detracking of the rubber belt is reduced to a minimum, the rubber belt can be employed in a larger range of soils and breaking of the rubber crawler due to detracking is reduced.

An important further advantage of the use of two rubber compositions is that the choice of the second rubber composition can be done independent of the choice of the first rubber composition. The first rubber composition can then be adapted to the soil onto which the rubber belt is to be used, whereas the second rubber composition can be chosen in function of the desired elastic properties of the connection between the respective first and second protrusions of adjacent metal links.

In a first preferred embodiment the first and second protrusions comprise a foot which extends in the height direction and the first and the second running surfaces protrude from the foot in the longitudinal direction of the crawler. The protruding running surfaces have the advantage that an increased overlap of the running surfaces of adjacent links in the longitudinal direction is realised, which further decreases the risk to detracking because the first running surfaces are held more strongly in their correct configuration and because, when the first and the second running surfaces move away from each other, the overlap is maintained sufficiently long to hold the first running surfaces at their correct position with respect to the second running surfaces. This on one hand increases the operational reliability of the rubber belt and on the other hand increases the range of soils on which the rubber belt can be employed.

In a next preferred embodiment the second rubber composition is applied in a space between the first rubber composition and between two adjacent links where the running surfaces of adjacent links at least partially overlap in the longitudinal direction of the crawler.

In a further preferred embodiment the second rubber composition is applied below the first and second running surface elements. By applying the second rubber composition in such a way, the rubber belt achieves an ideal elasticity and an improved operational reliability. The forces which work on the running surface elements resulting from the elastic properties of the second rubber composition return the running surface elements back to their correct position when the first and the second running surface elements move back towards each other, without hindering a smooth mutual tilting of the running surface elements and metal links during driving of the rubber belt.

In another preferred embodiment the first running surface elements of the first metal link extend at least partially in a space between second running surface elements of an adjacent second metal link because of which the second running surface elements anchor the first running surface elements and an increased operational reliability with a minimal chance to detracking is achieved without hindering the smooth driving of the rubber belt.

In a further preferred embodiment the first and/or second running surface elements of the different metal links extend in line creating a continuous and levelled surface for guiding the guiding rollers. The levelled and continuous surface increases the operational reliability by among other things, reducing unnecessary vibrations.

In another preferred embodiment the metal links are completely embedded in the first rubber composition, thus further decreasing unnecessary vibrations, creating an even more levelled surface and providing the rubber belt with even better elastic characteristics as a consequence of which the operational reliability is further improved. Fully embedding of the metal links in the first rubber composition further offers protection to the metal links, thus reducing wear and reinforcing the anchoring, even further reducing the risk for detracking.

BRIEF DESCRIPTION OF THE DRAWINGS

The invention is further elucidated in the figures attached to the present application and the description of the figures below.

DETAILED DESCRIPTION OF THE PREFERRED EMBODIMENTS

The rubber belt 1 shown in FIGS. 1a-1d comprises an endless rubber belt 22 which is guided around toothed driving wheels. On the inner side of the rubber belt 22, between the driving wheels, supporting rollers are provided which support the weight of the driven machine transferred to the rubber belt 22. A plurality of metal links is embedded substantially parallel to each other at substantially regular distances in circumferential direction of the belt 22. The metal links 11 are usually subjected to a chemical treatment with the purpose of achieving an improved adhesion of the metal to the rubber of the belt. Preferably, the metal links are cast to allow an easy construction of a series of metal links. The mainly parallel and at regularly distances positioned metal links 11 envision an ideal driving by the rubber crawler 1.

As shown in FIGS. 1a-1d, each metal link 11 comprises a base 5 with a sprocket engager 15 in the middle which extends in the lateral direction from a first side 6 to a second opposing side 16. From the respective first 6 and the second 16 side a first 2 and second 12 wing extend in the lateral direction of the belt 22. Each metal link 11 further comprises a first 3 and a second 13 protrusion which extend from the first 6 and the second 16 side of the sprocket engager 15 in a height direction of the metal link 11 with respect to the base 5. The first 3 and the second 13 protrusion respectively comprise a first 7 and a second 17 upper surface for guiding the supporting rollers.

The base 5 preferably is substantially flat, the shape is however not critical for the invention and the base 5 can have any form which is deemed appropriate by the person skilled in the art. The base 5 of the different metal links 11 is preferably identical, which is however not critical for the invention.

The form of the sprocket engager 15 is not critical for the invention but is preferably cylindrically shaped and substantially round in cross section but can have different forms for the part in the longitudinal direction as well as the part in the lateral direction. The sprocket engager 15 can for example be cylindrically shaped in the lateral direction and/or can comprise narrowings over its length. The side of the sprocket engager 15 which contacts the ground preferably is flattened to assure a stable contact with the ground, as shown in the cross section of FIGS. 2a-2c. The length of the sprocket engager 15 depends among other things from the total dimensions of the rubber crawler 1 and the dimensions of the driving wheels, but can be determined by the person skilled in the art and is not critical for the invention. Preferably, the sprockets sprocket engagers 15 of the different metal links 11 of the rubber crawler 1 are identical and are located at regular distances from each other, so that a continuous driving of the rubber crawler 1 is assured and the forces caused by the driving wheels are transferred homogeneously and the tension thereby created is spread over the rubber belt 22. Such a driving decreases the wear and increases the operational reliability of the rubber crawler 1.

The first 2 and second 12 wing preferably have the same length and shape, this is however not critical for the invention and can be determined by the person skilled in the art. The precise dimensions of the wings 2, 12 depend among other things from, for example, the device that needs to be driven by the rubber crawler and the ground on which the rubber crawler 1 is positioned. The dimensions however are not critical for the invention and can be determined by the person skilled in the art, taken the envisioned application into account.

More preferably, the different metal links 11 have the same wings 2, 12 creating a homogeneous support of the rubber crawler 1 on the ground. A homogeneous support of the rubber crawler 1 by the ground ensures a decreased and also more equal wear of the rubber belt 22 and avoids damage to the ground.

Preferably, the first 7 and the second 17 upper surface of the respective first 3 and second 13 protrusion are flat thus avoiding an unnecessary resistance for guiding the supporting rollers and realising a smooth guiding of the supporting rollers over the upper surfaces 7, 17. The length, form and width of the upper surfaces 7, 17 are preferably chosen such that an as flat as possible, vibration free and production reliable surface is created for guiding the supporting rollers. The exact length, form and width of the upper surfaces are however not critical for the invention and can be determined by the person skilled in the art, among other things depending from the diameter of the driving wheel.

Preferably, the length, form and width of the first upper surface 7 equals the length, form and width of the second upper surface 17 and the first 7 and second 17 upper surface of a metal link 11 of a metal link 11 in a same plane. This is however not critical for the invention and the upper surfaces 7, 17 can as a consequence have a different length, form or width and/or lie in a different plane.

Preferably, the respective first 7 and second 17 upper surfaces of adjacent metal links 11 have the same form, length and width. The first 7 and second 17 upper surfaces of the adjacent metal links 11 more preferably respectively also lie in a same plane.

By providing identical flat equiplanar upper surfaces 7, 17 a homogeneous support of the supporting rollers and a smooth rolling surface for the guiding of the guiding rollers can be realised. Such a guiding and support, for example, ensure an increased operational reliability of supporting rollers and rubber belt 22, a smoother and more vibration free driving of the rubber crawler 1 and also decrease the damage which the rubber crawler 1 can inflict to the ground supporting it, creating a broad spectrum of grounds which can be worked, but also reduce the damage to the device and the discomfort for the driver of the device, allowing a great driving speed on hard grounds.

The protrusions 3, 13 comprise a first 4 and a second 14 running surface element which extend in a longitudinal direction of the crawler 1, in which the second running surface element 14 is mounted shifted in longitudinal and the lateral direction of the belt 22 with respect to the first running surface element 4. The first running surface element 4 protrudes from a first side of the cross section of the link 11 and the second running surface element 14 protrudes from a second opposing side of the cross section. The running surfaces 4, 14 of each protrusion 3, 13 of a metal link 11 comprise the respective upper surface 7, 17 of the protrusion 3, 13.

Figure 1A:
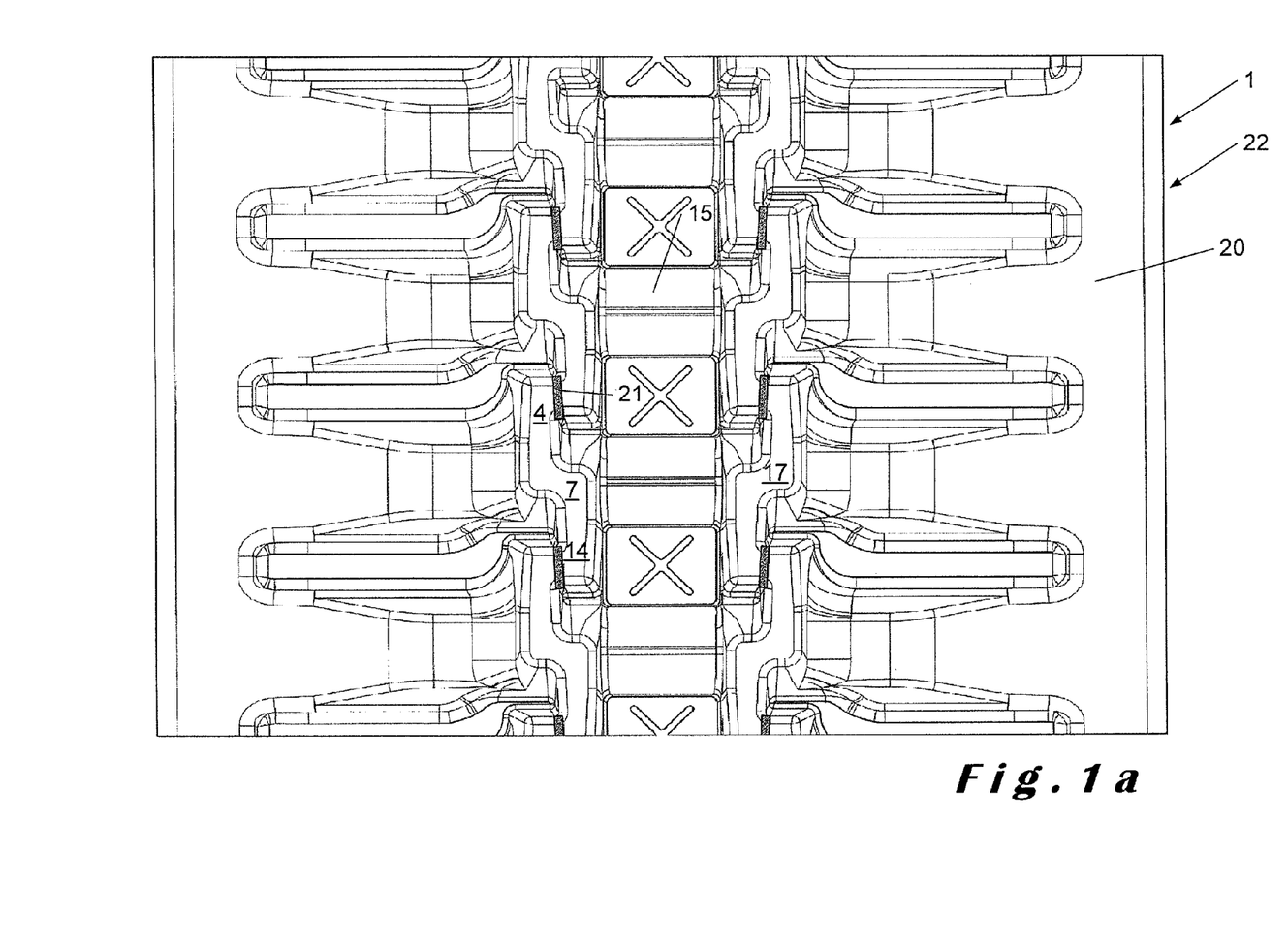
FIG. 1a is a top view showing an overview of a part of a rubber belt according to the invention including the first and second rubber compositions (20, 21).
Figure 1B:
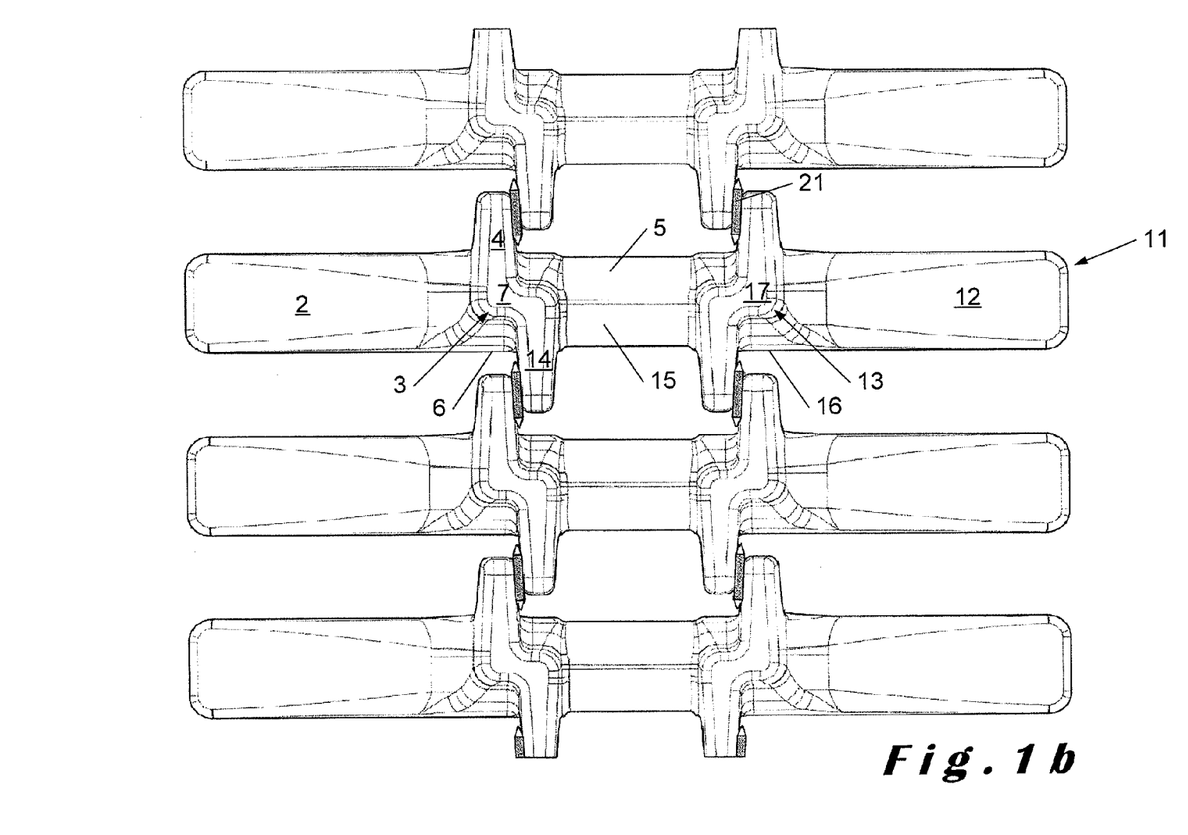
FIG. 1b shows the overview of the part of the rubber belt according to FIG. 1a but with the first rubber composition omitted.
Figure 1C:
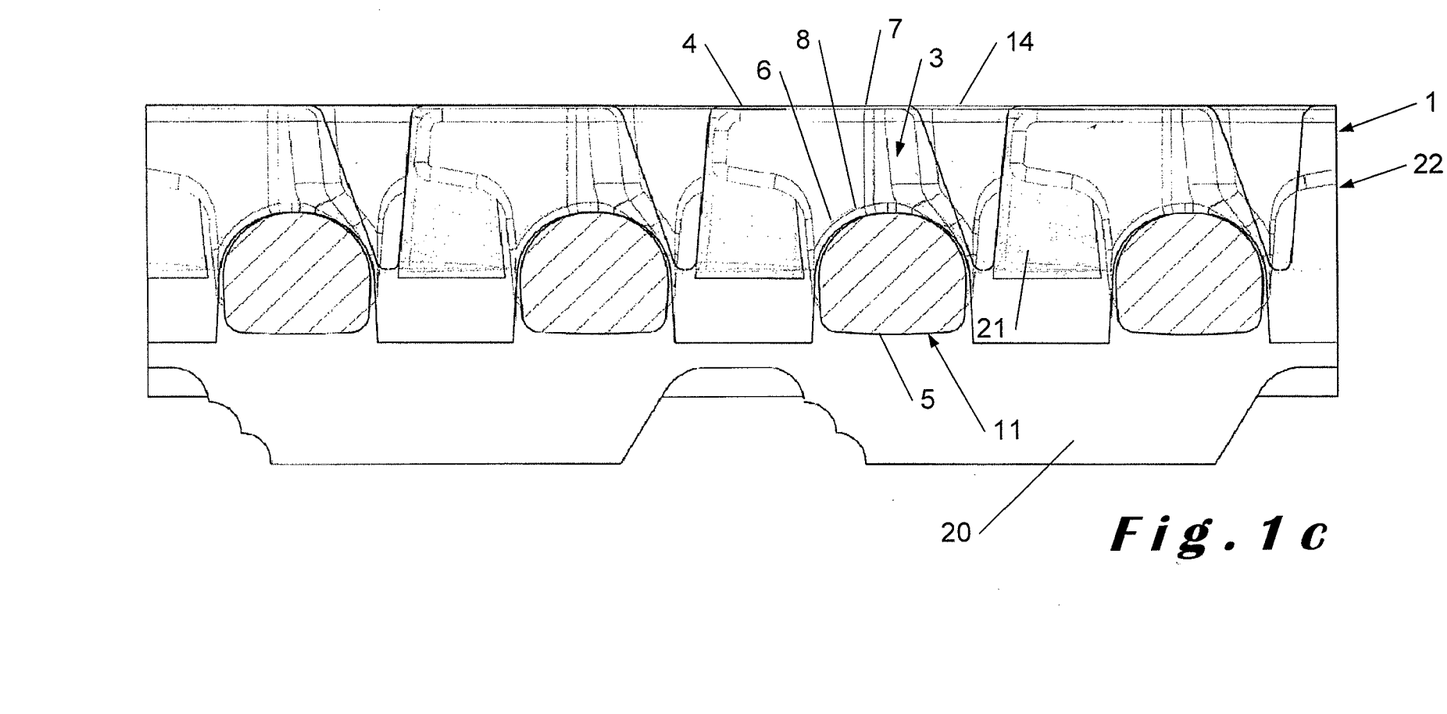
FIG. 1c shows a cross section of the rubber belt according to FIG. 1a along the middle of the bases 5 indicated in FIG. 1a in which only the outline of the first rubber composition is rendered
Figure 1D:
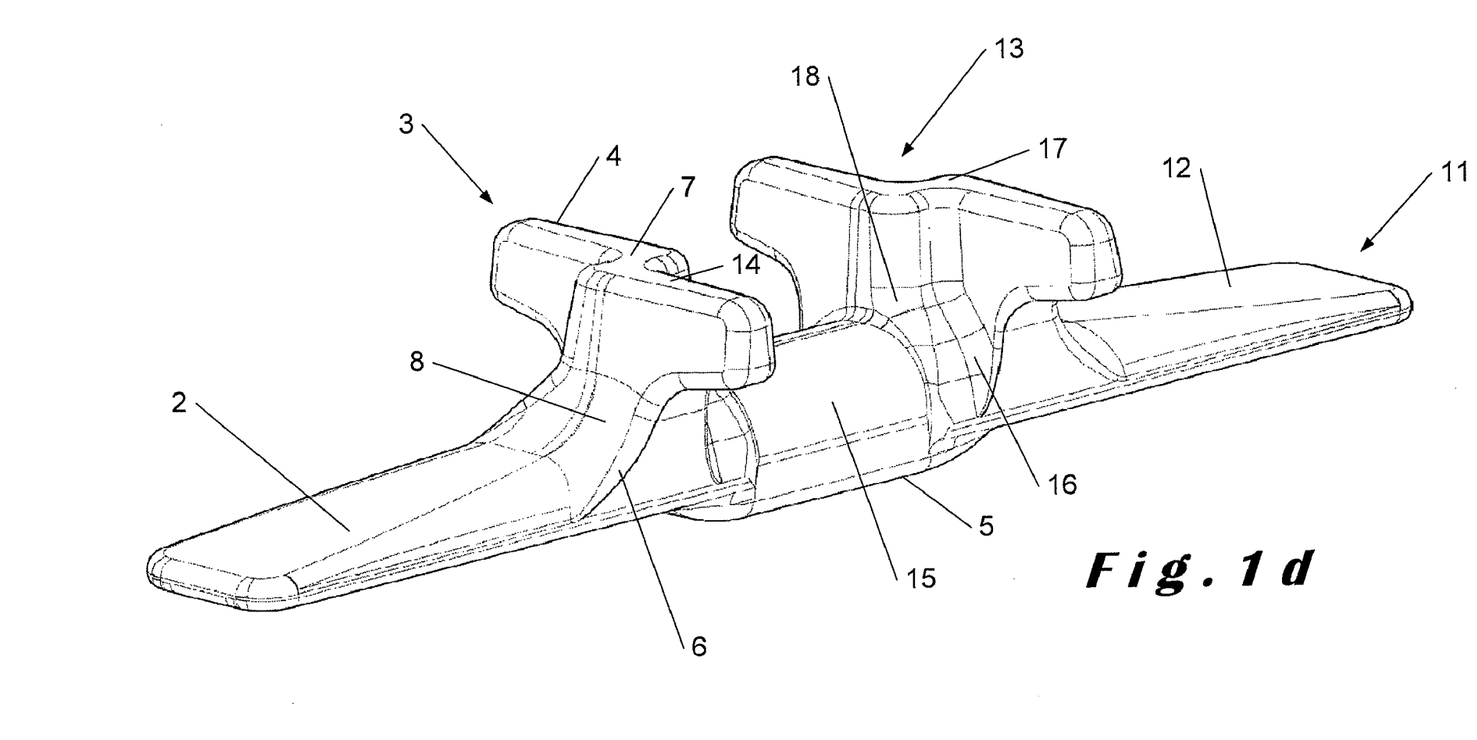
FIG. 1d shows an overview of one of the metal links shown in FIG. 1b but with the second rubber composition omitted
Figure 1E:
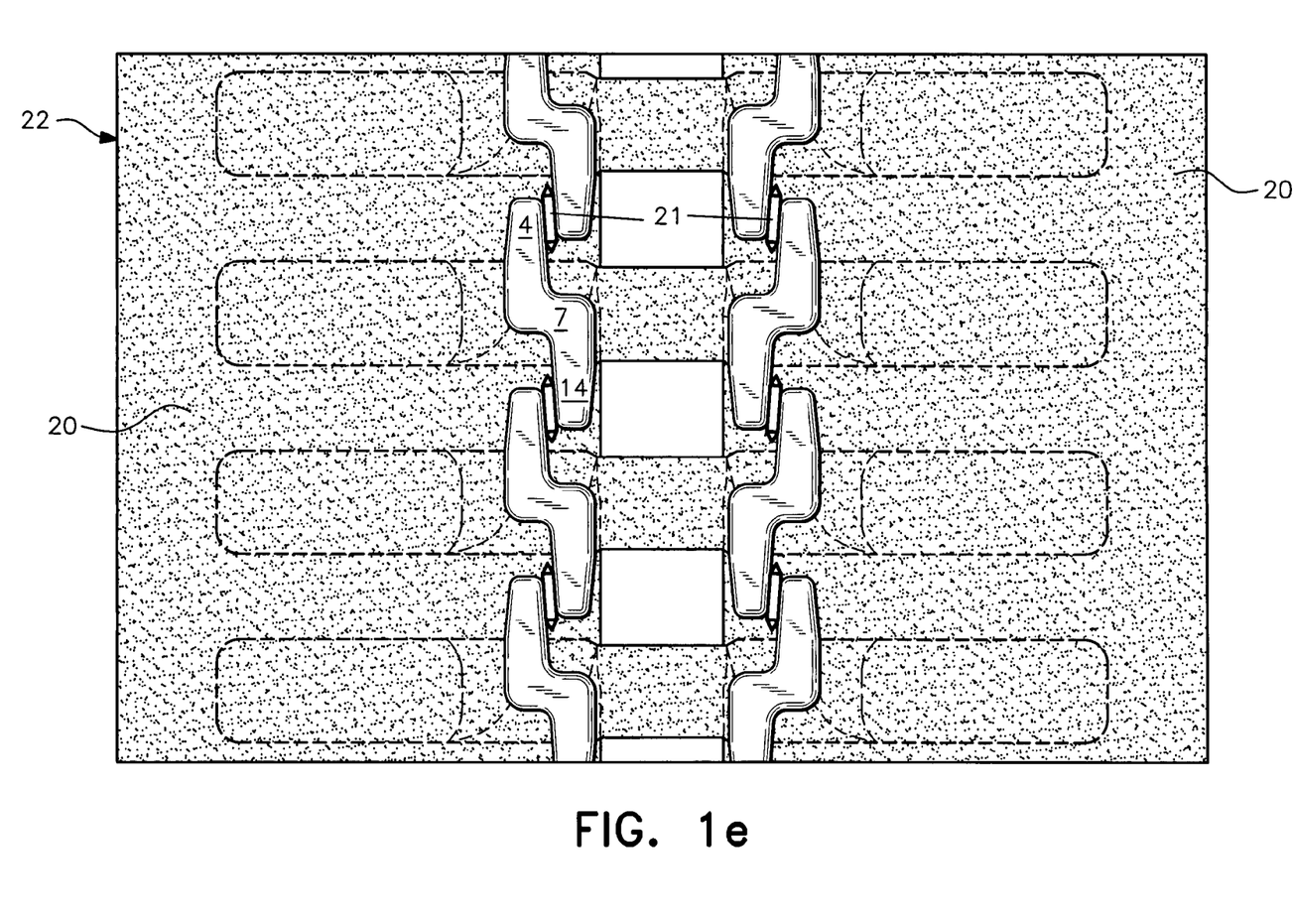
FIG. 1e is a top view showing an overview of a part of endless rubber belt (22) according to the invention having metal links, except for the upper surface (7)—formed by the protrusions (4,14)—of each link, completely embedded in the first rubber composition (20).
Figure 1F:
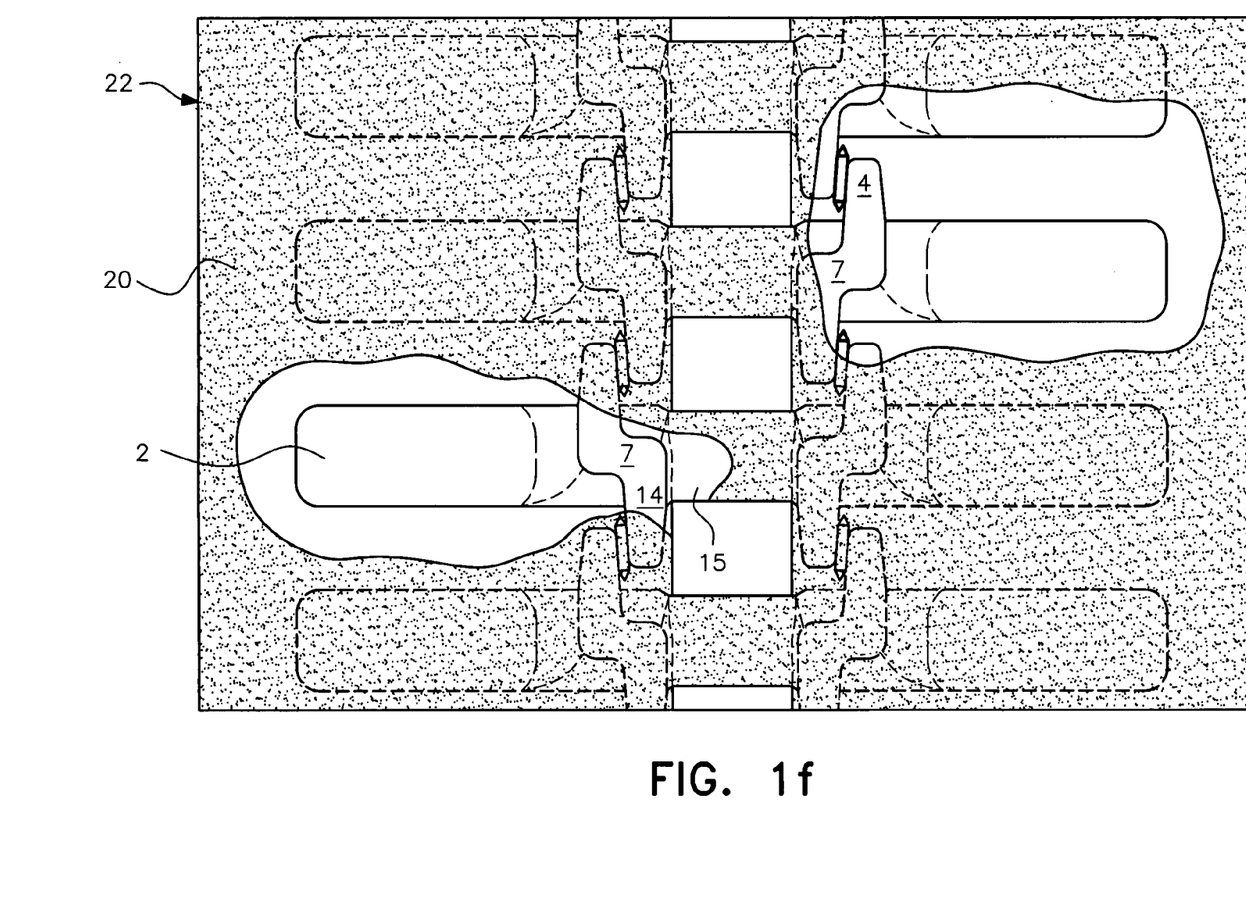
FIG. 1f is a top view showing an overview of a part of endless rubber belt (22) according to the invention having metal links completely embedded in the first rubber composition (20).

The first 3 and the second 13 protrusions, as shown in FIG. 1d, preferably comprise first 8 and second 18 feet which extend in the height direction. The first 4 and second 14 running surface elements preferably protrude in the longitudinal direction with respect to the feet 8, 18. The feet 8, 18 however are not critical for the invention and the protrusions 3, 13 can however also comprise the running surface elements 4, 14 without the feet 8, 18. The first foot 8 preferably is as wide as the first wing 2 and the second foot 18 preferably is as wide as the second wing 12. The shape of the foot 8, 18 is however not critical for the invention and can be determined by the person skilled in the art. The feet 8, 18 of the different metal links 11 more preferably are equal, which is however not critical for the invention.

Figure 2A:
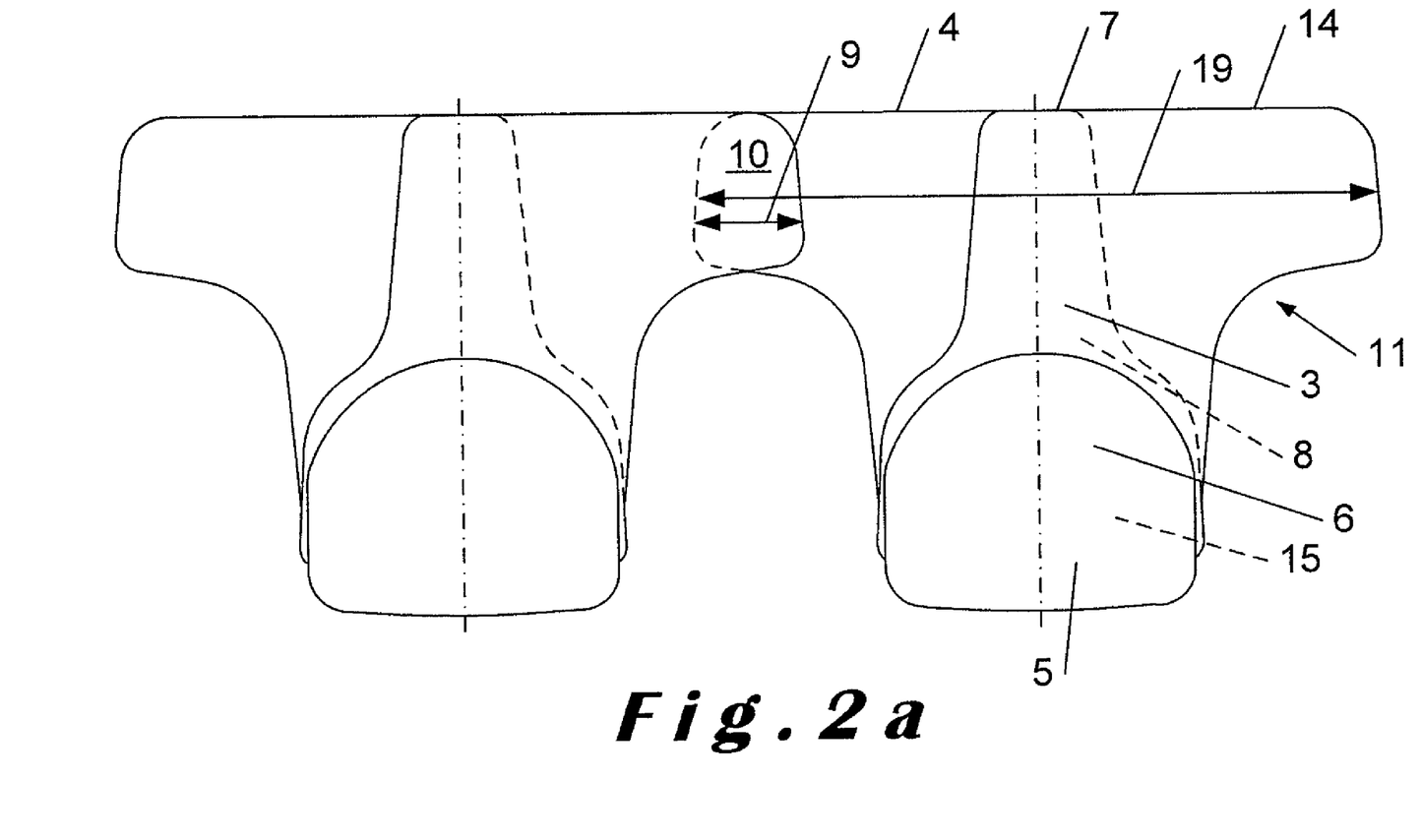
FIG. 2a shows a cross-section of two adjacent metal links according to the invention at rest.
Figure 2B:
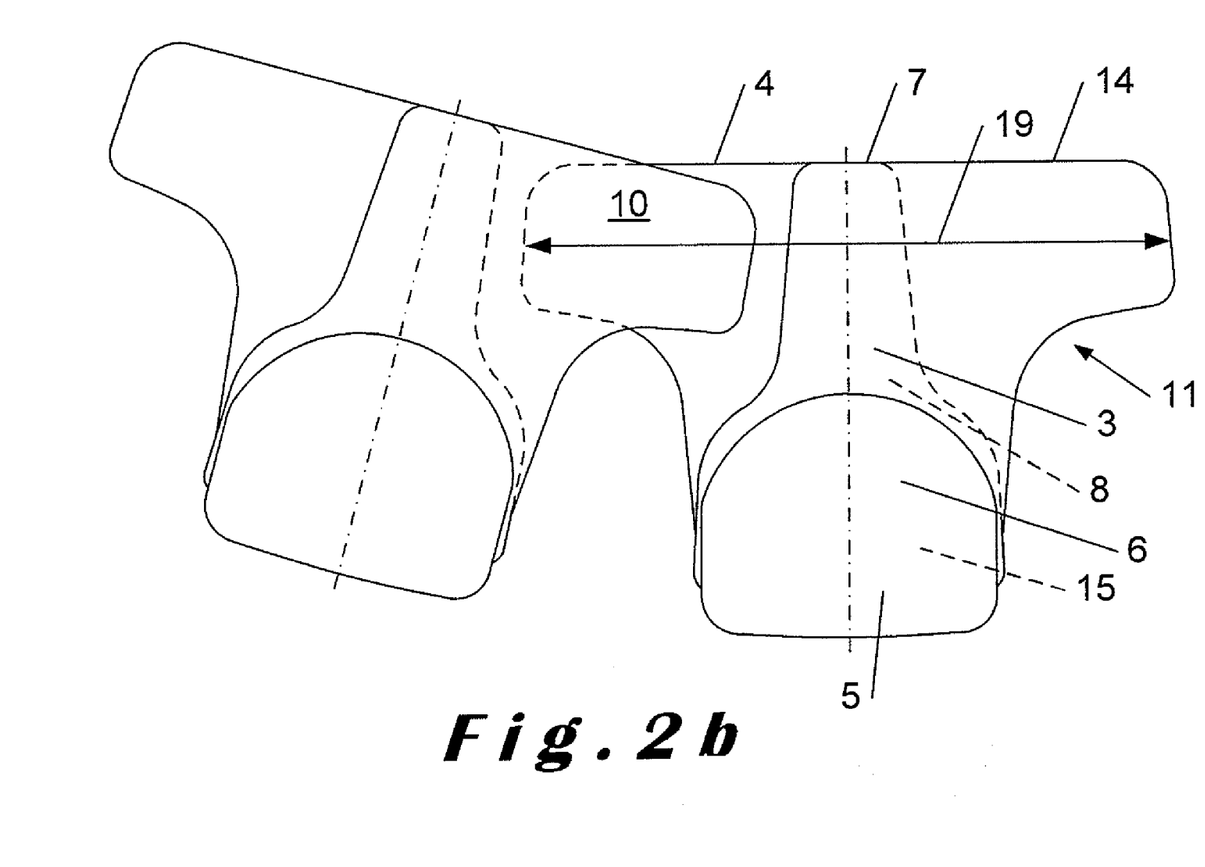
FIG. 2b shows a cross-section of two adjacent metal links according to the invention when moving towards each other.
Figure 2C:
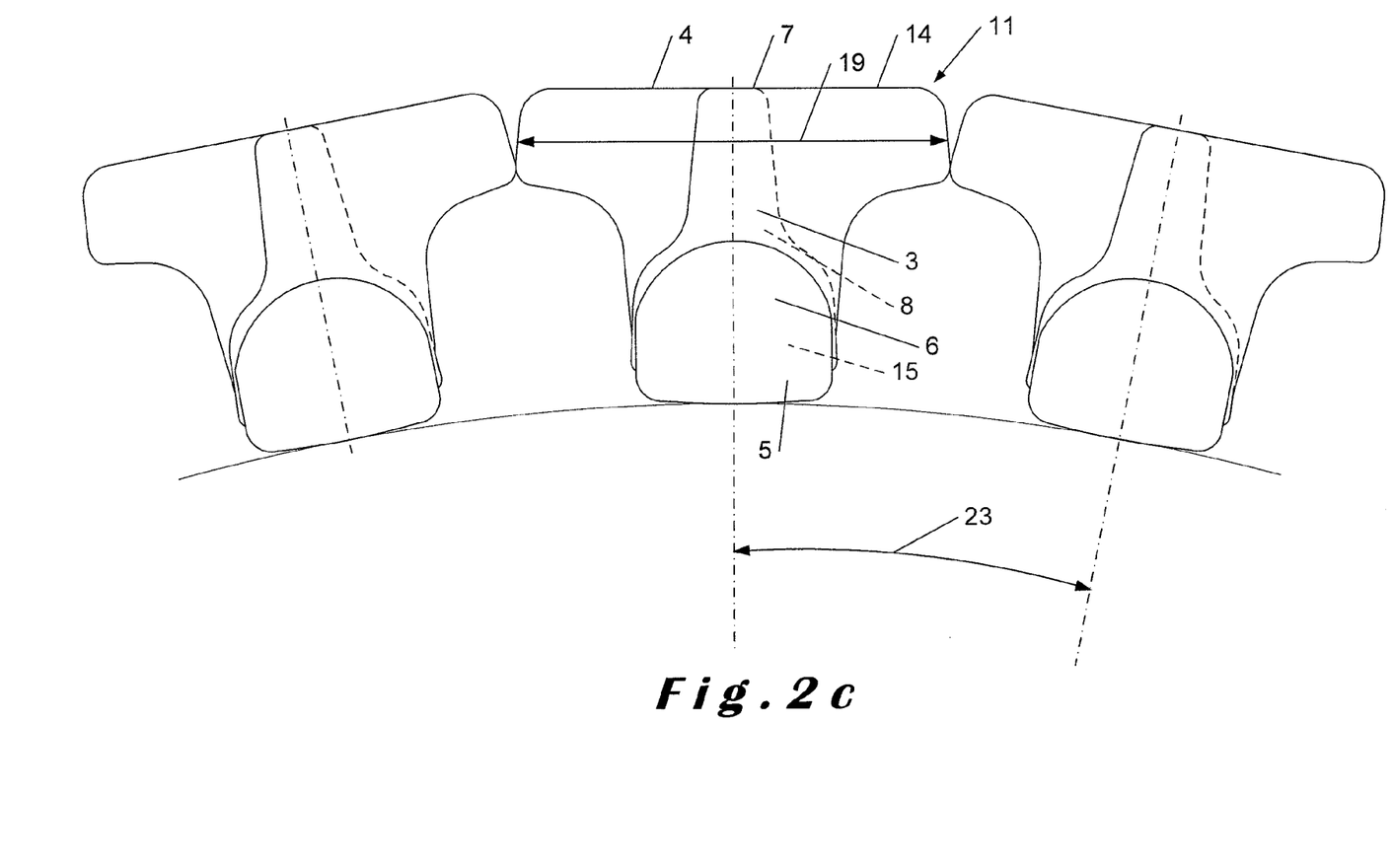
FIG. 2c shows a cross-section of two adjacent metal links according to the invention when moving away from each other.

The shape of the running surface elements 4, 14 which protrude with respect to the feet 8, 18 preferably is longitudinally shaped in the longitudinal direction of the belt 22 and preferably is rectangular, as shown in FIGS. 2a-2c. However, other shapes are possible and the first 4 and second 14 running surface elements can, for example, be triangular or trapezoidal. In case the first 4 and the second 14 running surface elements are united, without foot 8, 18 with the protrusions 3, 13, the form of the running surface elements preferably is trapezoidal or triangular. The shape of the running surface elements 4, 14, notwithstanding the presence of a foot 8, 18, in other words preferably is such that the upper surface 7, 17 is prolonged in the longitudinal direction of the rubber belt 22 supporting and guiding the supporting rollers.

The first 4 and second 14 running surface elements of adjacent metal links 11 in unbent condition, as shown in FIG. 2a, lie at least partially next to each other in the longitudinal direction of the rubber belt 22 causing part of the surface of the running surface elements to overlap and delimiting a common area 10 which extends over an overlapping length 9.

In a first preferred embodiment according to the invention, the overlapping length 9 makes out 1% to 40%, preferably 5% to 30% and more preferably 10% to 25% of the length 19 between the end part of the first running surface element 4 and the end part of the second running surface element 14 of the metal link 11. Such a configuration of the adjacent running surface elements 4, 14 further decreases the risk of detracktion of the rubber crawler 1 since such an overlap to great extend allows the metal links 11 to move away from each other without increasing the risk for detracktion of the rubber crawler 11.

As shown in FIG. 2b, the common surface area 10 increases when the running surface elements 4, 14 move towards each other, for example when the links move around the driving wheels.

As shown in FIG. 2c, the common surface area 10 decreases when the running surface elements 4, 14 move away from each other, for example when the rubber crawler moves over a local elevation such as a stone or a step.

The metal links 11 preferably are mounted anchoring each other in their respective correct positions. The distance between the first running surface elements 4 of the metal links 11 hereto preferably is smaller than the distance between the second running surface elements 14 so that the first running surface elements 4 of a first metal link 11 can be received between the second running surface elements 14 of a second adjacent metal link 11. This way the mutual position in width direction of the first and second metal link 11, and therefore the mutual position of all metal links 11 is determined. This configuration of the metal links 11 allows a supple driving of the rubber crawler 1 in the longitudinal direction of the rubber crawler 1 and assures a solid form of the rubber crawler 1 ensuring a stable guiding and achieving a greater operational reliability.

As shown in FIG. 2c, the running surface elements at a maximal angle 23 between the protrusions 3, 13 of adjacent running surface elements 4, 14 reach a point in which the running surface elements are no longer positioned next to each other. When the running surface elements 4, 14 at that position move away further from each other, the metal links 11 are no longer mutually anchored, and the risk rises that the mutual anchorage is broken, for example since the first running surface elements are no longer positioned between the second running surface elements 14 and that the rubber crawler 1 in other words could detrack.

The maximal angle 23 can be increased by a further protrusion of the running surface elements in the longitudinal direction of the rubber belt 22. Preferably, a larger angle 23 is reached by allowing the running surface elements 4, 14 to protrude from a foot 8, 18, as discussed earlier on and as shown in FIG. 2c. The larger maximal angle 23 decreases the risk for detracking and increases the mutual area 10 also resulting in a more sturdy mutual anchorage of the metal links 11 in the unbent condition. By choosing the form of the running surface elements 4, 14 such that a prolongation of the upper running surface 7, 17 in the longitudinal direction of rubber belt 22 is reached, in addition to better guiding a better mutual anchorage of the metal links 11 and a larger operational reliability is achieved.

The running surface elements 4, 14 preferably extend in line and thereby form a continuous and flat running surface to guide the supporting rollers.

The first 4 and the second 14 running surface elements are preferably flat in the longitudinal direction of the belt 22 but can also be curved according to the requirements of the application. Other forms are however possible and the running surface elements 4, 14 can comprise broadenings and narrowings in the lateral direction of the belt 22. The flat shape of the first 4 and the second 14 running surface elements ensures that adjacent first 4 and second 14 running surface elements do not hinder each other when they move next to each other while the rubber crawler 1 is driven.

The first 4 and second 14 running surface elements are preferably point symmetrically positioned with respect to the middle of the foot 8, 18.

The first 3 and the second 13 protrusions of the link 11 are equal to each other contributing to a decreased wear and a smooth and simple driving of the rubber crawler 1.

The protrusions more preferably are positioned reflection symmetrically with respect to each other on opposing sides of the sprocket engager 15.

In a preferred embodiment of the invention the link 11 comprises a reflection axis through the sprocket engager 15 in the longitudinal direction of the rubber belt 22. The symmetrical link 11 adds to an homogeneous and decreased wear of the crawler 1 and to a simple and smooth driving of the rubber crawler 1.

The respective first 3 and second 13 protrusions of the different metal links 11 preferably are equal to each other such that a continuous support of the supporting rollers is made possible. The different adjacent metal links 11 more preferably are equal to each other.

The base 5 of the metal links 11 preferably is at least partially embedded in a first rubber composition 20. The wings 2, 12 and/or the sprocket engagers 15 preferably are also at least partially embedded in the first rubber composition 20.

The wings 2, 12 and the sprocket engagers 15 are more preferably embedded in the first rubber composition 20. By fully embedding sprocket engager 15 and wings 2, 12 in the first rubber composition 20, the wear of the sprocket engager 15 and the wings 2, 12 is decreased and a better grip with the ground is realised. The rubber belt 22 can also be applied to a broader spectrum of grounds since the ground is no longer damaged by the immediate contact with the wings 2, 12. Since vibrations are also avoided, the wear of the driven vehicle is also decreased and annoying noises are avoided. The first rubber composition can for example be chosen in function of the ground onto which the rubber crawler 1 will be applied.

Both protrusions 3, 13 are further preferably fully embedded in the first rubber composition further improving the guiding of the guiding rollers over the upper surface 7, 17 since a further levelled upper surface is realised. This decreases the wear of the upper surfaces 7, 17 and the supporting rollers and improves the driving by the rubber crawler 1. Vibrations are also further avoided further decreasing wear and annoying noises. Full embedment of the protrusions 3, 13 has also the advantage that the protrusions 3, 13 are kept at their correct location by the first rubber composition and that the belt detracks less easily.

In the invention the respective first 3 and second 13 protrusions of adjacent metal links 11 are further at least partially embedded in and connecter to each by a second rubber composition 21 having a higher elasticity than the first rubber composition 20 and which is connected with the first rubber composition 20 forming a continuous layer. The metal link 11 is more preferably fully embedded in the first rubber composition 20.

The second rubber composition 21 has as a further advantage that while the adjacent running surface elements 4, 14 are moving away from each other the adjacent running surface elements 4, 14 and therefore also the metal links 11 are guided back to their original location strongly reducing the risk that the different metal links 11 break out off their mutual anchorage, causing the belt to detrack.

The second rubber composition 21 also gives the belt 22 more elastic properties, which improves the driving by the rubber belt 22. The operational reliability is also increased since vibrations are, among other things, avoided.

The second rubber composition 21 preferably is applied in a space between the first rubber composition 20 and between two adjacent links 11 of which the running surface elements 4, 14 of adjacent links 11 at least partly overlap in the longitudinal direction of the rubber crawler 1. The second rubber composition 21 is more preferably applied below the first 4 and the second 14 running surface elements.

By applying the second rubber composition 21 in such a way, the elastic character of the rubber belt 22 is enhanced and the risk that the position of adjacent running surface elements 4, 14 changes while the rubber crawler 1 is driven, increasing the operational reliability. Applying the second rubber compound 21 in such a way keeps the adjacent running surface elements 4, 14 from touching each other during driving of the rubber crawler 1 decreasing the wear of the running surface elements 4, 14 and increasing the operational reliability. When the second rubber composition 21 is located in a space between the first rubber composition 20, the connection between the two rubber compositions 20, 21 improves and thus the quality of the continuous layer improves. The connection between the two rubber compositions 20, 21 and the quality of the rubber belt 22 also further increases when the rubber belt 22 is vulcanised. By increasing the quality of the continuous layer, the friction between the two rubber compositions 20, 21 at the now continuous contact area is reduced, decreasing the wear of the transition between the two rubber compositions 20, 21, increasing the operational reliability.

Since the choice for the first 20 and the second 21 rubber composition can be performed independently from each other, its specific function can be taken into account when choosing the respective rubber compositions. For the first rubber composition 20, for example a rubber composition can be chosen in function of its characteristics in relation to the envisioned ground while the second composition can be chosen in function of its elastic characteristics.

The first rubber composition 20 can for example be a rubber composition already known to the person skilled in the art for covering rubber crawlers. Every other rubber composition which is deemed appropriate by the person skilled in the art, can however also be chosen.

The second rubber composition 21 preferably is chosen in function of its elastic characteristics and hardness. A second rubber composition is preferably chosen having a hardness of 5-60, more preferably 5-40 or even in the interval 5-20 or 20-40, in which the values are measured according to the Shore A standard. The second rubber composition 21 when extended preferably is capable of reaching a length of 400% with respect to the length of the second rubber composition 21 in relaxed state before breaking. More preferably a length of 500% can be reached.

The second rubber composition 21 can for example comprise polyurethane having a hardness of 5-20 measured according to the Shore A standard. Every other rubber composition which is deemed appropriate by the person skilled in the art, can however also be used.

Next to a first and a second rubber compositions additional rubber compositions can be embedded in the rubber belt 22.

The invention claimed is:

1. A rubber crawler (1) supporting an endless rubber belt (22) guided around two toothed wheels and supporting rollers positioned between them, a plurality of parallel metal links (11) being embedded at regular distances from each other in circumferential direction of the rubber belt (22) and extending in a lateral direction of the rubber belt (22), each metal link (11) comprising
   a base (5) provided with a sprocket engager (15) in its center,
   a first (2) and a second (12) wing extending in the lateral direction of the crawler (1) at opposing sides (6, 16) with respect to the sprocket engager (15), and
   a first (3) and second (13) protrusion at opposing sides (6, 16) of the sprocket engager (15) and extending in a height direction of the metal link (11) with respect to the base (5),
   each protrusion (3, 13) comprising a first (4) and a second (14) running surface element which extends in a longitudinal direction of the crawler (1), in which the second running surface element (14) is positioned shifted in longitudinal and the lateral direction of the belt (22) with respect to the first running surface element (4), in which the first running surface element (4) protrudes from one side of the metal link (11) and the second running surface element (14) protrudes from an opposite side of the metal link (11) in the longitudinal direction of the crawler (1), in which the upper surfaces form a running surface (7, 17) for guiding the supporting rollers, in which the first (4) and the second (14) running surface elements of adjacent metal links (11) are positioned adjacent with respect to each other in the longitudinal direction, wherein the base (5) of the metal links (11) is at least partially embedded into a first rubber composition (20) and wherein the first (3) and second (13) protrusions of adjacent metal links (11) are partially embedded in and connected to each other by a second rubber composition (21) which has a higher elasticity than the first rubber composition (20) and which is vulcanized with the first rubber composition (20) for forming a continuous layer of rubber.

2. A rubber crawler (1) according to claim 1, wherein each of the first (3) and second (13) protrusions comprises a foot (8, 18) extending in the height direction of the metal link (11) and wherein one of the first (4) and the second (14) running surface elements protrudes from each foot (8, 18) in the longitudinal direction of the crawler (1).

3. A rubber crawler (1) according to claim 1, wherein the sum of both lengths (9) of at least one metal link (11) over which first (4) and second (14) running surface elements of adjacent metal links (11) are adjacent in a non-bent position of the crawler (1) is 10% to 25% of the length (19) between the end part of the first running surface element (4) and the end part of the second running surface element (14) of the link (11).

4. A rubber crawler (1) according to claim 1, wherein the second rubber composition (21) is applied in a space between the first rubber composition (20) and between two adjacent links (11) in which the running surface elements (4, 14) of adjacent links (11) overlap at least partially in the longitudinal direction of the crawler (1).

5. A rubber crawler (1) according to claim 1, wherein the second rubber composition (21) is applied below the first (4) and second (14) running surface elements.

6. A rubber crawler (1) according to claim 1, wherein the first running surface elements (4) of a first link (11) extend at least partially in a space between the second running surface elements (14) of an adjacent second metal link (11).

7. A rubber crawler (1) according to claim 1, wherein the first (4) or second (14) running surface elements of the different metal links (11) extend in line.

8. A rubber crawler (1) according to claim 1, wherein the first (4) and the second (14) running surface elements of the first (3) or the second (13) protrusion point symmetrically positioned with respect to each other.

9. A rubber crawler (1) according to claim 1, wherein the first (3) and second (13) protrusion of a metal link (11) are mirror images.

10. A rubber crawler (1) according to claim 1, wherein the metal links (11) are mirror images.

11. A rubber crawler (1) according to claim 1, wherein the metal links (11) are completely embedded in the first rubber composition (20).

12. A rubber crawler (1) according to claim 1, wherein the second rubber composition (21) has a hardness within a range of 5-60, measured according to the Shore A standard.

13. A rubber crawler (1) according to claim 1, wherein the second rubber composition (21) has a hardness within a range of 5-40, measured according to the Shore A Standard.

14. A rubber crawler (1) according to claim 1, wherein the second rubber composition (21) has a hardness within a range of 5-20, measured according to the Shore A Standard.

15. A rubber crawler (1) according to claim 1, wherein the second rubber composition (21) has a hardness within a range of 20-40, measured according to the Shore A Standard.

16. A rubber crawler (1) according to claim 1, wherein the second rubber composition (21) when extended is capable of reaching a length of 400% with respect to the length of the second rubber composition (21) in relaxed state before breaking.

17. A rubber crawler (1) according to claim 1, wherein the second rubber composition (21) when extended is capable of reaching a length of 500% with respect to the length of the second rubber composition (21) in relaxed state before breaking.

18. A rubber crawler (1) according to claim 1, wherein the second rubber composition (21) comprises polyurethane.

* * * * *